PHENOLIC RESIN PRODUCTS AND THEIR PRODUCTION
Filed Aug. 2, 1952
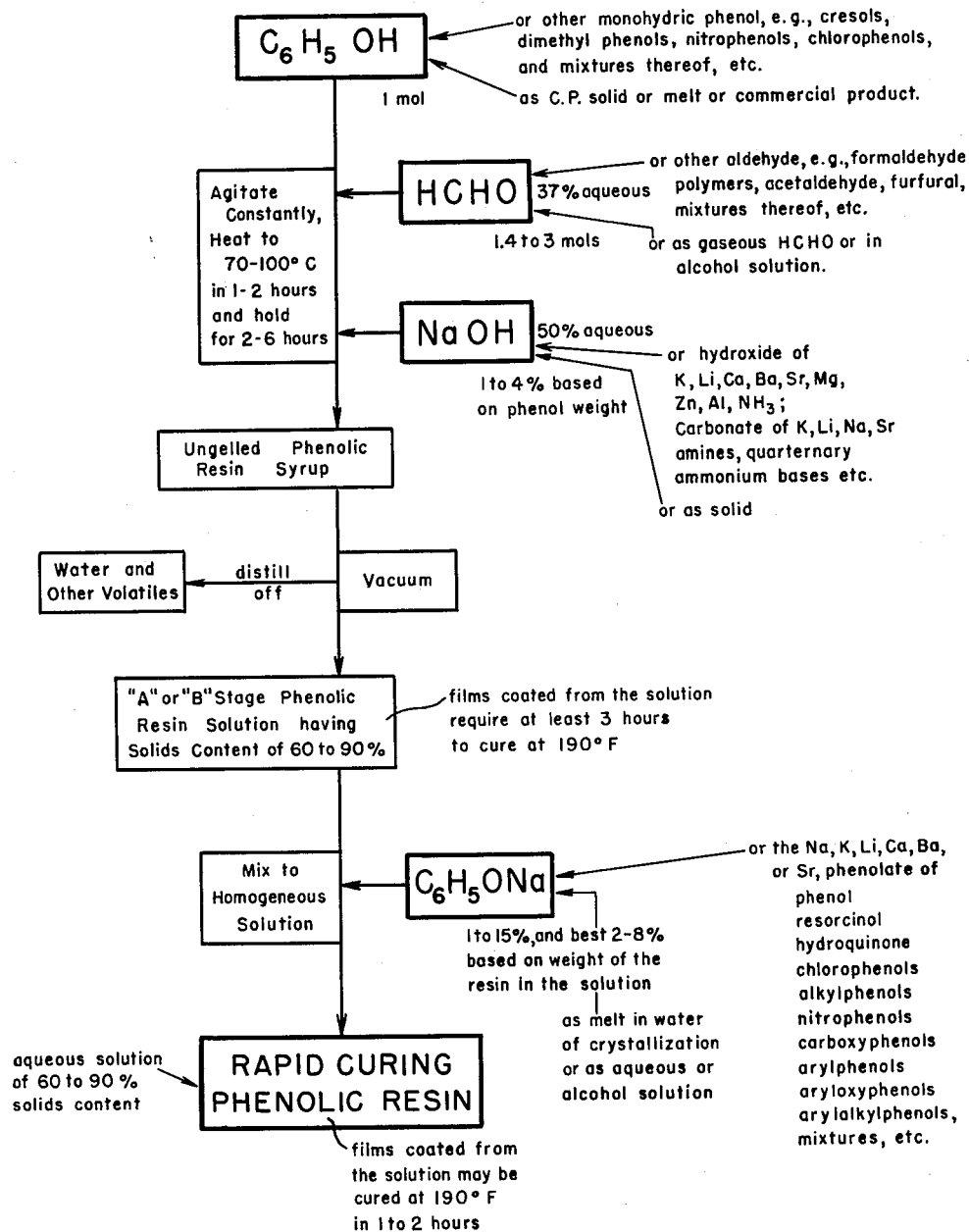
INVENTOR
Charles S. Webber
BY Carroll F. Palmer
ATTORNEY

United States Patent Office 2,736,718
Patented Feb. 28, 1956

2,736,718

PHENOLIC RESIN PRODUCTS AND THEIR PRODUCTION

Charles S. Webber, Loudonville, N. Y., assignor, by mesne assignments, to Norton Company, Worcester, Mass., a corporation of Massachusetts Application August 2, 1952, Serial No. 302,381

6 Claims. (Cl. 260—29.3)

This invention relates to new, improved phenolic resin products and their production. More particularly, it relates to (1) methods for accelerating the heat-curing of phenolic resins, (2) the production of phenolic resin compositions which, although relatively very stable during storage, can be rapidly heat cured at elevated temperatures to an infusible state, (3) to adhesive compositions comprising thermosetting phenolic resins and basic phenolates as curing acceleration agents and (4) to infusible phenolic resin products, including films, made from such resin compositions.

FIELD OF THE INVENTION

Although phenolic resins of many varieties are now used in huge quantities for a multitude of purposes, the high temperatures and/or length of time generally required to cure most phenolic resins to convert them to infusible products, have limited the extent of use of these materials. Hence, much research has been devoted to the possible discovery of means by which the rate of cure of phenolic resins may be increased and/or the temperature of cure may be decreased.

One line of attack has been to substitute in whole or in part dihydric phenols, such as resorcinol, hydroquinone, orcinol, and the like, for monohydric phenols more generally employed in producing the phenolic resins. Examples of this approach to the problem and of such products are to be found in U. S. Patents 2,414,414, 2,414,415, 2,429,369 and 2,502,511.

The dihydric phenol-containing resins cure at lower temperatures and in shorter time than resins made exclusively of monohydric phenols. However, although the curing cycles in such resins are improved, the inclusion of the dihydric phenols creates other serious disadvantages which limit the usefulness of such modified phenolic resins. For example, they are found to possess poor storage stability and very short pot life so that when used industrially they complicate manufacturing operations.

Another disadvantage of the dihydric phenol-containing resins for many applications is the fact that thermoset films produced therefrom are relatively weak, friable and cannot withstand much flexing without disintegration. This is particularly significant to many industrial users of phenolic resins, e. g., the abrasive industry where thermosetting phenolic resins are used in bonding abrasive grain, including the making of coated abrasives. Thus, in forming sandpaper, when abrasive grains are attached to the outer surface of a backing material by means of a phenolic resin adhesive, the resin bond must be strong, and tough, in order that the grain will be held to the backing material during use of the coated abrasive sheet even though the abrasive grains are subjected to very severe impacts and although the coated abrasive may be flexed many thousands of times a minute such as with abrasive endless belts which pass over pulleys in sanding operations. Hence, coated abrasives require a resin adhesive which is not only strong, but also which possesses great toughness so that it may withstand the impact placed upon the abrasive grains during use of the abrasive product.

Because of the inherent tendency of dihydric phenol-containing resins to form weak, friable, cured films, this type of resin has not been used very much by the coated abrasive industry while the slower curing monohydric phenol-aldehyde resins are used almost exclusively. In order to increase production and lower the cost of manufacturing satisfactory coated abrasives, continual research is devoted to the development of possible methods to allow the monohydric phenol-containing resins to be cured at more rapid rates or at lower temperatures and still obtain adhesive bonding films of high strength and toughness.

One approach to the problem of increasing cure rates has been the use of curing accelerators, e. g., see U. S. Patents 2,441,860 and 2,489,145. Such attempts have been to some extent successful, but where phenolic resins are used to form adhesive films with the phenolic resin adhesive coming into contact with cellulosic backing materials, as in the making of coated abrasives or in the manufacture of plywood, many of the developed curing accelerators, particularly acidic materials, are unsatisfactory due to their tendency to deteriorate the cellulosic backing when the fabricated product is stored for any length of time.

The use of phenolic resins for adhesive purposes also creates additional special demands on the products which must be met if the phenolic resins are to be useful for this purpose. Thus, not only must the phenolic resins be capable of being stored safely over relatively long periods of time and possess a good pot life although being capable of curing rapidly at relatively low temperatures, but, in addition, they must be able to be formed from solutions or liquid mixtures having desirable viscosity properties into relatively thin, even films having good tackiness. Water is most commonly used as the solvent material in the formation of adhesive compositions of phenolic resins. In such cases, it is necessary to produce a phenolic resin composition having a high solids or resin content in order that film of sufficient body and tackiness to hold abrasive grain can be formed which will not require removal of too large quantities of water or other solvents. The good solvent miscibility in the resin products must not, however, be obtained at the expense of the water-resistance properties of the cured resin films made from the solutions. Considerable research has been directed toward the solution of this type of problem in the formation of phenolic adhesive compositions, e. g., see U. S. Patents Re. 23,347, 2,186,369 and 2,150,698.

As can be appreciated, any method or technique developed for increasing the rate of cure and/or decreasing the cure temperature of phenolic resins, particularly those used in the formation of phenolic resin adhesive compositions, must take into account the storage stability, pot life, water or solvent miscibility, viscosity and tackiness factors as well as cured film strength, toughness and flexibility features if the method or technique is to be useful on a commercial scale.

OBJECTS

A principal object of this invention is the provision of new means for accelerating the cure of phenolic resins, particularly those which are useful in making adhesive compositions, without at the same time detracting from the other properties or characteristics required of phenolic resins for their successful use for such purposes. Further objects include:

1. The provision of faster curing monohydric phenol-aldehyde resin compositions.

2. The provision of new phenolic resin curing accelerators.

3. The provision of new means for increasing the rate of cure of phenolic resins while at the same time retaining good pot life and storage stability.

4. The provision of new phenolic resin compositions which may be formed into films and then thermoset at relatively rapid rate and/or relatively low temperatures to give strong, tough, films.

5. The provision of phenolic resin syrups uniquely suited for use in coated abrasive manufacture.

6. The provision of adhesive compositions comprising phenolic resins and unique curing accelerators in an aqueous solution having high solids content which may be formed into adhesive films of good tackiness.

7. The provision of means by which it is possible to control the water solubility, viscosity, pot life, gel time, storage stability, tackiness and curing rate of phenolic resin compositions through the addition to preformed phenolic resin products of small amounts of curing agents which do not detract from these desirable properties of the phenolic resin, but actually enhance them.

8. The provision of phenolic resin adhesive products of low alkalinity which may be formed into infusible films of good water insensitivity.

9. Provision of means for increasing the surface gloss of cured phenolic resin films.

10. Provision of means for increasing the bonding power of cured phenolic resin films to abrasive grain or other materials such as paper, cloth, fiber, rubber, metal, plastic and the like.

11. The provision of phenolic resin curing accelerators which are non-corrosive to metal molds and which do not deteriorate cellulosic surfaces with which they may come into contact or with which they may be associated for long periods of time.

12. The provision of phenolic resin products that may be cast to give molded articles which have enhanced clarity and transparency.

13. The provision of new processes for accelerating the curing of resin adhesives in the bonding of discrete solid particles with such adhesives.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the addition of small amounts of basic phenolates as modifiers and curing accelerators to preformed monohydric phenol-aldehyde resins or otherwise contacting the preformed resins with the basic phenolates prior to thermosetting the resin to the infusible state.

The success of the present invention is due primarily to the discovery that if a monohydric phenol is condensed with an aldehyde to a sufficient extent to produce a fusible, phenolic resin and then, prior to the conversion of the phenolic resin into the infusible state, a basic phenolate in small amounts is added to or contacted with the resin, the rate of thermosetting of the resin is very substantially increased. This phenomenon occurs notwithstanding the fact that stability to storage and pot life as well as other desirable properties and characteristics of the resin are not adversely affected. The inclusion of the basic phenolates has also been found to enhance the water-tolerance of the uncured resins and to increase the surface gloss properties of films made from the modified phenolic resins.

Fundamentally, the present invention comprises condensing a monohydric phenol with an aldehyde, desirably in the presence of an alkaline catalyst such as sodium hydroxide and in an aqueous medium, with constant agitation by heating the mixture to an elevated temperature and holding it at the elevated temperature until sufficient reaction between the phenol and the aldehyde has occurred to form a resinous condensation product which is both fusible and heat-convertible. The desired extent of reaction in this preforming operation can be best regulated by testing the "water tolerance" of the condensation product in a manner to be described more fully below. In any event, the condensation reaction is terminated before the reaction mixture gels.

When the phenolic resin has been preformed with a suitable degree of condensation, the basic phenolate can be added immediately or at some subsequent stage in the handling of the resin up to the time at which thermosetting of the resin to an infusible state commences. Preferably the basic phenolate is added in an amount of 1 to 15% by weight based upon the weight of the phenolic resin in the mass to which the basic phenolate is added.

Most desirable results, particularly in the formation of aqueous adhesive syrups from the phenolic resins, are obtained by first concentrating the aqueous phenolic resin reaction mass to give a solids content in the aqueous solution of between 60 and 90%. This can most suitably be accomplished by vacuum distilling the preformed polymer mixture. This forms "A" or "B" stage phenolic resin solutions having a solids content of 60 to 90% by weight. The basic phenolate is best added to such a resin syrup prior to use and the mixture thoroughly agitated to insure even distribution of the phenolate throughout the mass.

As a result of these operations, a rapid curing phenolic resin product is obtained which can be used for most purposes for which phenol-aldehyde resins are known to be useful. However, the concentrated resin syrups are particularly adapted to the formation of resin films, such as by spray coating, roller coating, doctor blade coating and brush coating, which can be thermoset to give strong, tough films.

DETAILED DESCRIPTION

A more complete understanding of the procedures and products of the present invention may be had by reference to the accompanying drawing in which:

The figure is a schematic flow diagram of the new processes setting forth the preferred modes of operation.

The flow diagram of the drawing mentions certain specific reactants and reaction conditions which are the most desirable in carrying out the present invention. Other materials and reaction conditions can be employed, however, as will be explained more fully in a later section of this specification. For instance, although the flow diagram refers to the production of a thermosetting type of phenolic resin, it has been discovered that the basic phenolate modification technique of this invention may also be used to accelerate the curing of solid pulverized Novolak type resins normally brought about by the addition of paraformaldehyde to the Novolak resin.

The first stage of the reaction is the condensation of phenol or other monohydric phenol with a commercial formalin solution or other suitable aldehyde reactant. The aldehyde is used in proportion of 1.4 to 3 mols of active aldehyde value for each 1 mol of active phenol value.

Preferably the condensation is carried out in an aqueous medium which in the case of formalin is created by the 60 to 63% of water present in the aqueous solution and in the presence of an alkaline condensation catalyst, of which sodium hydroxide is an example. The alkaline catalyst is best introduced as an aqueous solution, e. g., a 50% aqueous NaOH solution, and in a quantity of about 1 to 4% by weight based upon the weight of the phenol in the reaction mixture.

During the condensation reaction the mixture should be agitated constantly. At the same time, the mass is gradually heated over a period of one to two hours at a temperature of about 70 to 100° C. It is held at this temperature for a sufficient length of time to cause the phenol and aldehyde to polymerize to a point where two phases form when the reaction mass is cooled to 30° C. or it may be carried even further if desired, but should not be carried to such an extent that the mass gels. Generally this will be from 2 to 6 hours making it a total reaction period under heat of 3 to 8 hours or more.

When the desired reaction point has been reached, vacuum is applied to cause water and other volatiles to distill off from the aqueous reaction solution. This immediately causes the temperature of the reaction mixture to drop and stops the further condensation of the phenol and aldehyde.

The vacuum distillation is continued until sufficient volatile material has been removed to cause the solids content of the reaction mixture to reach between 60 and 90% by weight. The amount of water and other volatiles removed in this operation will of course vary and depend to a large extent upon the amount of water originally present in the reaction mass since this is an excess of the amount of water created by the condensation reaction.

At this point sodium phenoxide or other suitable basic phenolate is added to the resin syrup in a concentration of 1 to 15% by weight of the resin in the syrup and for best results in a concentration of 2 to 8% by weight. In the case of sodium phenoxide, the acceleration agent is added as a melt of the salt dissolved in its own water of crystallization or in added water. With other phenolates, they may be added as the solid material or as a solution in water or alcohol.

Upon addition of the basic phenolate, the resin syrup is stirred sufficiently to mix the phenolate throughout the syrup. This forms an aqueous solution of a rapid curing phenol aldehyde resin having a solids content of about 60 to 90% by weight. This solution can be stored for quite long periods of time, e. g., up to 40° F. for 6 months, without deterioration or the like. When used, e. g., in the coated abrasive or plywood manufacturing industries in which quantities of the product are maintained in vessels or pots at elevated temperatures for application to materials to be adhesively bonded with the phenolic material, the resin syrups are found to have relatively long pot life and good viscosity characteristics to form even, tacky films.

The resulting rapid curing phenolic resins may be molded by the usual casting procedure with or without the addition of fillers, dyes, pigments or the like. On the other hand, the resin solutions as formed are especially well suited for use as adhesives and for this purpose films or layers of the resin syrup may be formed by any suitable method. Then after the adhesive is brought into contact with the surfaces to be adhered, the resin film or layer may be heat converted to an infusible state by heating it to an elevated temperature, e. g., between 60 and 300° C., for a sufficient length of time to convert the resin to the infusible state.

The following Tables I and II help to illustrate the improvement in the rate of cure of phenol-aldehyde resins by the present invention by comparing certain phenol-formaldehyde resins of specific phenol to aldehyde ratios with the rate of cure of the same resins containing indicated percentages by weight, based upon the weight of the resin, of sodium phenoxide. In every case, the resin compositions contained 33⅓% by volume of comminuted calcium carbonate filler (see U. S. Patent 2,322,156).

The time of cure is given at 190° F. in minutes for the indicated resins and the degree of thermoset by three different tests the first of which is called the "pencil hardness test," the second a "snip test," and the third the "boil test."

In the "pencil hardness test," 9H indicates a substantially completely cured product, while in the "snip test" this is indicated by "T" and in the "boil test" by "5." A complete description of these tests will be found in a later section of this specification.

Table I.—Rate of cure

"PENCIL HARDNESS" TEST

| Phenol/ CH₂O, Time at 190° F., in mins. | Molar Ratios | | | | | | | | | | | |
|---|---|---|---|---|---|---|---|---|---|---|---|---|
| | 1:2.8 | | 1:2.4 | | 1:2.04 | | 1:1.8 | | 1:1.4 | | 1:1.2 | |
| | Resin A | +6.6% NAOC₆H₅ | Resin B | +6.1% NAOC₆H₅ | Resin C | +5.7% NAOC₆H₅ | Resin D | +5.5% NAOC₆H₅ | Resin E | +5.6% NAOC₆H₅ | Resin F | +5.5% NAOC₆H₅ |
| 10 | 5B | 5B | 5B | 5B | 5B | 5B | 5B | 5B | 5B | 5B | 5B | 5B. |
| 30 | 5B | 5B | 5B | 5B | 5B | 5B | 5B | 5B | 5B | 5B | 5B | 5B. |
| 50 | 5B | 5B | 5B | 5B | 5B | 5B | 5B | 5B | 5B | 5B | 5B | 5B. |
| 70 | 5B | 5B | 5B | 5B | 5B | 2B-3B | 5B | 5B | 5B | 5B | 5B | 5B. |
| 90 | 5B | 3H-4H | 5B | 5B | 5B | HB-F | 5B | 5B | 5B | 5B | 5B | 5B. |
| 110 | 5B | 6H-7H | 5B | B-HB | 5B | HF | 5B | 2H-3H | 5B | 2B-3B | 5B | 5B. |
| 130 | 5B | 9H | 5B | HF | 5B | 2H-3H | 5B | 4H-5H | 5B | F-H | 5B | 5B. |
| 150 | 5B | 9H | 4B-5B | 2H-3H | 4B-5B | 4H-5H | 5B | 9H | 5B | 9H | 5B | 5B. |
| 170 | HB-B | 9H | 2H-3H | 8H-9H | 2H-3H | 9H | B-2B | 9H | HB-B | 4B-5B | 5B | 5B. |
| 190 | H-F | 9H | 6H-7H | 9H | 5H-6H | 9H | H-2H | 9H | 3H-4H | 5H-6H | 5B | 5B. |
| 210 | 2H-3H | 9H | 8H-9H | 9H | 9H | 9H | 3H-4H | 9H | 8H-9H | 9H | 7H-8H | 5B. |
| 230 | 7H-8H | 9H | 9H | 9H | 9H | 9H | 9H | 9H | 9H | 9H | 5B | 5B. |
| 250 | 9H | 9H | 9H | 9H | 9H | 9H | 9H | 9H | 9H | 9H | B-HB | HB-F. |
| 270 | 9H | 9H | 9H | 9H | 9H | 9H | 9H | 9H | 9H | 9H | 4H-5H | 9H. |

"SNIP TEST"

| | | | | | | | | | | | | |
|---|---|---|---|---|---|---|---|---|---|---|---|---|
| 10 | Plastic | Plastic | Plastic | Plastic | Plastic | Plastic | Plastic | Plastic | Plastic | Plastic | Plastic | Plastic. |
| 30 | do | do | v. sl. F | do | do | do | v. sl. F | do | do | do | do | Do. |
| 50 | v. sl. F | v. sl. F | do | sl. F | v. sl. F | v. sl. F | v. sl. F | v. sl. F | v. sl. F | sl. F | v. sl. F | v. sl. F. |
| 70 | v. sl. F | sl. F | v. sl. F | F | sl. F | v. sl. F | sl. F | F | v. sl. F | F | sl. F | sl. F. |
| 90 | sl. F | sl. F | sl. F | sl. F | sl. F | v. sl. F | F | F | sl. F | V. F | sl. F | F. |
| 110 | sl. F | T | F | sl. F | sl. F | sl. F | sl. F | sl. F | V. F | V. F | F | V. F. |
| 130 | sl. F | T | sl. F | sl. F | v. sl. F | sl. F | V. F | V. F | V. F | V. F | F | V. F. |
| 150 | sl. F | T | sl. F | sl. F | sl. F | sl. F | V. F | T | V. F | V. F | F | V. F. |
| 170 | T | T | T | T | sl. F | T | T | T | T | T | F | V. F. |
| 190 | T | T | T | T | T | T | v. sl. F | T | sl. F | sl. F | V. F | V. F. |
| 210 | T | T | T | T | T | T | T | T | T | v. sl. F | V. F | V. F. |
| 230 | T | T | T | T | T | T | T | T | v. sl. F | T | v. sl. F | v. sl. F. |
| 250 | T | T | T | T | T | T | T | T | T | T | v. sl. F | v. sl. F. |
| 270 | T | T | T | T | T | T | T | T | T | T | v. sl. F | T. |

Table II.—Rate of cure

"BOIL" TEST

| Phenol/ CH₂O, Time at 190° F., in mins. | Molar Ratios | | | | | | | | | | | |
|---|---|---|---|---|---|---|---|---|---|---|---|---|
| | 1:2.8 | | 1:2.4 | | 1:2.04 | | 1:1.8 | | 1:1.4 | | 1:1.2 | |
| | Resin A | +6.6% NAOC₆H₅ | Resin B | +6.1% NAOC₆H₅ | Resin C | +5.7% NAOC₆H₅ | Resin D | +5.5% NAOC₆H₅ | Resin E | +5.6% NAOC₆H₅ | Resin F | +5.5% NAOC₆H₅ |
| 10 | 1 | 1 | 1 | 1 | 1 | 1 | 1 | 1 | 1 | 1 | 1 | 1 |
| 30 | 1 | 1 | 1 | 1 | 1 | 1 | 1 | 1 | 1 | 1 | 1 | 1 |
| 50 | 1 | 1 | 1 | 1 | 1 | 1 | 1 | 1 | 1 | 1 | 1 | 1 |
| 70 | 2 | 2 | 1 | 1 | 2 | 2 | 1 | 1 | 1 | 1 | 1 | 1 |
| 90 | 4 | 5 | 2 | 4 | 2 | 4 | 2 | 4 | 1 | 1 | 1 | 1 |
| 110 | 4 | 5 | 2 | 5 | 4 | 4 | 2 | 4 | 1 | 1 | 1 | 1 |
| 130 | 5 | 5 | 4 | 5 | 4 | 5 | 4 | 5 | 2 | 2 | 1 | 1 |
| 150 | 5 | 5 | 5 | 5 | 5 | 5 | 5 | 5 | 2 | 3 | 2 | 1 |
| 170 | 5 | 5 | 5 | 5 | 5 | 5 | 5 | 5 | 4 | 4 | 2 | 1 |
| 190 | 5 | 5 | 5 | 5 | 5 | 5 | 5 | 5 | 5 | 5 | 3 | 2 |
| 210 | 5 | 5 | 5 | 5 | 5 | 5 | 5 | 5 | 5 | 5 | 3 | 3 |
| 230 | 5 | 5 | 5 | 5 | 5 | 5 | 5 | 5 | 5 | 5 | 5 | 5 |
| 250 | 5 | 5 | 5 | 5 | 5 | 5 | 5 | 5 | 5 | 5 | 5 | 5 |
| 270 | 5 | 5 | 5 | 5 | 5 | 5 | 5 | 5 | 5 | 5 | 5 | 5 |

Resin A=68.5% resin content; resin B=74.1% resin content; resin C=78.4% resin content; resin D=81.7% resin content; resin E=79.9% resin content resin F=81.1% resin content. (All resins were aqueous solutions of indicated resin content and were mixed with 33⅓% by volume of subdivided calcium; carbonate filler.)

Scale.—1=soluble; 2=partial dissolution; 3=slight dissolution; 4=whitening without solution; 5=insoluble.

EXAMPLES

The following illustrative examples of actual operations in accordance with the present invention will enable those skilled in the art to obtain a more complete understanding of specific details of the procedures and products of this invention.

In the example, all parts are by weight, all pH values are as measured by a glass electrode and all percentages of added basic phenolates are by weight based upon the weight of the phenolic resin in the mixture to which the phenolate is added, unless otherwise specified.

Example I

This example illustrates the modification of a phenol formaldehyde resin having 2.4 mols of formaldehyde for each mol of phenol with sodium phenoxide.

To a mixture of 768 parts of 37.5% formalin and 376 parts of U. S. P. phenol, 7.5 parts of 50% aqueous sodium hydroxide solution are added and the mixture is heated under reflux and constant stirring to a maximum of 85° C. in one to 1½ hours and is held at this temperature (about 5 hours) until a sample withdrawn and cooled to 30° C. just becomes turbid or separates into two phases. The reaction mixture is then dehydrated with constant agitation in vacuo to a solids content of approximately 70–74%. The pH of the mixture decreases from 8.4 at the beginning to around 7.4 at the end of the reaction.

The resin solution at the beginning of the vacuum dehydration has water tolerance of 0 but this value increases depending on the quantity of water evaporated therefrom so that the final resin has a water tolerance of 1 from at about 70% solids to as much as 20 at about 80% solids content. The viscosity of the resin, which is 23,500 cps. at 20° C. and 73.5% solids, may therefore be adjusted with water within narrow limits without phase separation. However, upon addition of sodium phenoxide according to the invention the water tolerance is increased proportionately to the quantity added. With 10% sodium phenoxide tetra hydrate (equivalent to 6% by weight of NaOC₆H₅) the water tolerance is raised from 2 to 138. In another case, 13.3% NaOC₆H₅.4H₂O is added and the water tolerance is raised to 168. The sodium phenoxide lowers the viscosity of the solution of itself, and therefore, even greater latitude in viscosity is possible with it.

The maximum acceleration in cure rate is obtained at approximately 4 to 6% NaOC₆H₅ with the resin of this example. Other phenoxides have other maximums, but sodium, potassium and lithium phenoxides are approximately equivalent in reactivity. More than about 6% to 8% of these accelerators begins to have less activity, but the water tolerance progressively increases as the sodium phenoxide is increased.

The cure at 190° F. of the unmodified resin requires at least 180 minutes to give a boiling water insensitive state, whereas with 10% NaOC₆H₅.4H₂O addition, the same cure is obtained in 120 minutes or less.

Indicative of the shorter cure time is the shorter "gel time" which is 310 with 10% sodium phenoxide tetra hydrate whereas with the unmodified resin it is 371.

Example II

This example illustrates the production of a phenol-formaldehyde resin having a formaldehyde to phenol molar ratio of 1:2.8 compounded with sodium phenoxide as a cure accelerator.

To 627 parts of 37.5% formaline, 282 parts of phenol and 3.0 parts of sodium hydroxide are added in a receptacle provided with a mechanical stirrer, controlled heat source and reflux condenser. The temperature of the mixture is raised to 97° C. in 1¼ hours and is held for 2½ hours longer at 90–96° C., i. e., until a 10 g. sample removed from the reactants tolerates no added water at 30° C. without formation of a turbid solution indicative of the formation of two phases. The product is then dehydrated at once in vacuo at about 28 mm. Hg to a solids content of 70 to 75%, which causes the water tolerance to increase to 14 at a viscosity of 39,000 cps. (75° C.).

The resulting resin mixture is divided into 5 separate portions and 2.4%, 4%, 6%, and 8% of sodium phenoxide is added to 4 of these. After thorough mixing, the "gel times" of the different portions are tested and found to be as follows:

| Resin Portion | Gel Time |
|---|---|
| No added sodium phenoxide | 345 |
| Plus 2.4% sodium phenoxide | 304 |
| Plus 4% sodium phenoxide | 251 |
| Plus 6% sodium phenoxide | 230 |
| Plus 8% sodium phenoxide | 240 |

The maximum rate of cure acceleration is at 6% concentration of NaOC₆H₅.

This resin is faster curing than the resin of Example I, but with the formaldehyde at the higher ratio more vapors were evident in workrooms and this disadvantage must be balanced against the faster rate of cure obtained.

If the quantity of free formaldehyde in the resin is objectionable as in open dry rooms, it may be overcome by adding ammonium hydroxide until no formaldehyde odor is detected and before excess ammonia is evident as disclosed in U. S. 2,437,981. The sodium phenoxide maintains its accelerating action in the presence of the ammonia.

The rate of gel may be decreased by carrying the reaction beyond a water tolerance of 0 through control of the degree of condensation by determining the cloud point.

*Example III*

This example illustrates the formation of a resin having a phenol to formaldehyde ratio of 1:2.0 modified with sodium phenoxide.

To a mixture of 654 parts of 37.5% formalin and 377 parts of phenol contained in a reactor having a reflux condensor and mechanical stirrer are added 7.1 parts of 50% aqueous sodium hydroxide giving a mixture with a pH of 8.4. The temperature of the reactants is increased to 84° C. in one hour and held at 82–86° C. for 5 hours. Samples are removed at 15 minute intervals in the last hour of the reaction and are titrated at 30° C. with distilled water until a permanent turbidity develops which requires progressively less water until the final sample requires approximately 0.1 cc. (1 water tolerance). At this point vacuum dehydration is started which in 2 hours at a final pressure of 26 mm. Hg and 32° C. increases the solids to 78.4% with a viscosity of 17,500 cps. (25° C.).

The resulting resin has a gel time of 475 at a water tolerance of 18. This is accelerated to a gel time of 360 with a water tolerance of 147 by admixture of 5.7% $NaOC_6H_5$ with the resin.

*Example IV*

This example illustrates formation of a resin having a phenol to formaldehyde ratio of 1:1.8 modified by admixture of sodium phenoxide.

To a solution of 470 parts of phenol in 720 parts of 37.5% formalin, 9.18 parts of 50% aqueous sodium hydroxide are added giving a solution with a pH of 8.43. The mixture is heated under reflux and with stirring by a controlled uniform source of heat to 83° C. in one hour, and then held at 82–88° C. for 5 hours, i. e., to a water tolerance of 4.

The resultant "A" stage phenolic resin is vacuum dehydrated at 37° C. and 24.5 mm. Hg in 1⅓ hours to 81.7% solids. The viscosity at 25° C. is 59,000 cps. The gel time of the resulting resin is 466 which is reduced to 382 by adding 5.5% $NaOC_6H_5$. The phenoxide at the same time raises the water tolerance from 25 to 178.

*Example V*

This example shows the production of a resin having a phenol to formaldehyde ratio of 1:1.4 modified with sodium phenoxide.

To a solution of 564 parts phenol in 672 parts of 37.5% formalin, 11.37 parts of 50% aqueous sodium hydroxide are added giving a mixture with a pH of 8.3. The mixture is gradually heated in one hour to 85° C. and held 5¾ hours at 80–85° C. with constant stirring under reflux. Ebullition is controlled by adjustment of the very slight vacuum applied. When the water tolerance reaches 9, the vacuum is immediately increased to 25 mm. Hg rapidly cooling the resin to 35° C. The resin is further cooled to 20–25° C. with an ice bath. The dehydration is continued for 2½ hours ending with 22.8 mm. Hg at 34° C. yielding a solids content of 79.9% at 15,250 cps. (25° C.).

The resulting resin is found to have a gel time of 648. This is lowered to 588 by adding 5.6% $NaOC_6H_5$ and results in a water tolerance of 145.

Examples I through V show that with lower ratios of phenol to formaldehyde the accelerating effect of sodium phenoxide on the gel test decreases, but that the water tolerance change increases slightly.

*Example VI*

This example illustrates that when the concentration of the alkaline condensation catalyst is increased over that of Example I with a phenol to formaldehyde ratio the same as in Example I, the reaction is carried out at a lower temperature, and for a longer period of time to prevent uncontrolled gellation.

To 768 parts of 37.5% formalin and 376 parts of phenol, a solution of 10.25 parts NaOH in 10.25 parts water is added and the mixture is heated to 70° C. in ¾ hour. Heating is continued for eight hours at 70–80° C., i. e., to a water tolerance of 12. Vacuum dehydration is then applied and completed in 1¼ hour at a final internal pressure of 24.5 mm. Hg at 29° C. to a total solids of 57.4% and a water tolerance of 0. The viscosity of the resulting resin at 25° C. is greater than 100,000 cps., and measures 47,000 cps. at 37.8° C. The gel time is 248 at a water tolerance of 0 and with admixture of 8% $NaOC_6H_5$ is 236.

Because of the higher alkali content, the water tolerance of the resin of this example at the same degree of condensation is greater than the resin of Example I. However, the sodium phenoxide modifier still decreases the gel time from 248 to 236 and increases the water tolerance from 0 to 410. The storage life of this resin is between six and eight months at 40° F. whereas with the resins of Examples I through V is greater than eight months.

*Example VII*

In this example a resin having a phenol to formaldehyde ratio of 1:2.4 is formed having a viscosity so high as to be impractical to coat by usual coating methods, and illustrates how viscosity of phenolic resins may be modified by the addition of sodium phenoxide and water so as to transform an unusable adhesive phenolic composition to one which is usable.

To 458 parts of 37.5% formalin, 116 parts of paraformaldehyde and 376 parts of phenol, 15 parts of barium hydroxide .8H₂O are added with agitation in a receiver having mechanical stirrer and reflux attachment. The mixture having a pH of 8.1 to 8.2 is heated to 94° C. in one hour and held at 88–97° C. for 2¾ hours, i. e., until a water tolerance of 0 is found. The pH drops from 8.1 to 7.7 during the reaction.

Vacuum is now applied to distill water from the reactants over 1¼ hours and give a solids content of 80.6% ending with a temperature of 41° C. and a pressure of 45 mm. Hg. The water tolerance of the product is found to be 18 with a viscosity of 250,000 cps. (25° C.).

The viscosity of the resin is reduced to 3,450 cps. at 37.8° C. (100° F.) by adding 5.6% of $NaOC_6H_5$ (12.5% of the sodium phenoxide tetrahydrate of Example XIII) and water sufficient to lower the solids to 70% (by weight). The gel time of the phenolate modified resin is 363 whereas without the sodium phenoxide it is 425.

*Example VIII*

This example illustrates the formation of a resin having a phenol to formaldehyde ratio of 1:2.4 with sodium phenoxide cure accelerator being incorporated in the resin mixture after the condensation to desired degree but before vacuum dehydration of the resin syrup.

To 768 parts of 37.5% formalin, and 376 parts of phenol while mixing in a reactor under reflux, 8 parts of 50% aqueous NaOH are added to produce a mixture having a pH of 8.0. The mixture is heated in a jacketed reactor to a temperature of 78° C. in one hour and is raised in the next hour to 80° and then increased to 90° C. in the next ½ hour dropping back to 86° C. in the following ½ hour and held 5 hours at this temperature to give a resin syrup having a water tolerance of 0. At this point 57 parts of the sodium phenoxide tetrahydrate of Example XIII and 6 parts of water are added producing a viscosity of "I" on the Gardner-Holdt scale and a pH of 9.2. The reaction is then continued 1½ hours at 65° C. to a viscosity of "M" Gardner-Holdt, whereupon vacuum dehydration is applied and continued for 3½ hours to give a solids content of 72.2% and a final temperature of 28° C. at 20.5 mm.

The viscosity of the resulting product is 90,000 cps. at 25° C. The gel time is 269 with a water tolerance of 156 and an alcohol tolerance of 248. Addition to the premodified resin of 6.2% NaOC₆H₅ more gives a mixture having a gel time of 283. The resin may be stored 4 to 6 months at 40° F. compared to over 6 months for Example I material.

*Example IX*

In this example a resin having a phenol-formaldehyde ratio of 1:1.4 is made and modified by the addition of sodium phenoxide toward the end of the condensation reaction and prior to vacuum dehydration of the resin syrup.

To 672 parts of 37.5% formalin and 564 parts of phenol while mixing in a reactor under reflux, 11.8 parts of 50% aqueous sodium hydroxide are added giving a mixture with a pH 8.3.

The mass is heated externally while stirring to 84° C. in 1¼ hours and held at 80–85° C. for 7 hours, i. e., to give a mass with a water tolerance of 7.

To the reactants, 70 parts of the sodium phenoxide tetrahydrate of Example XIII and 7 parts of water are added raising the pH to 9.5. After heating further for ½ hour at 86° C. a viscosity of "X" by Gardner-Holdt tubes is obtained, whereupon the mass is vacuum distilled for 2½ hours finally reaching 30.2 mm. Hg at 34° C. and 71.1% solids. The water tolerance of the resin syrup at 30° C. is 29 with a gel time of 328 and the viscosity is 95,000 cps. (77° F.).

The addition of 17.6% NaOC₆H₅·4H₂O of Example XIII to the resin gives a mass having a gel time of 360.

The storage life of the resin of this example is less than that of Example V and for many purposes where an extended storage life is desired, the resin of Example V is preferred.

*Example X*

This example illustrates the formation of a phenol-formaldehyde resin having a ratio of 1:2.4 modified with 3,5-dimethyl phenol and shows that no substantial change is made in the action of the basic phenolate as compared with a straight phenol-formaldehyde resin in increasing the curing rate and the water tolerance of the resin.

To 820 parts of 37% formalin and 376 parts of phenol, 8.3 parts of 50% aqueous sodium hydroxide are added while stirring under reflux in a resin reactor. With heating, the temperature of the mixture is raised to 81° C. in one hour and held for 4½ hours at 78–82° C. to give a mass with a water tolerance of 67. At this point, 30.5 parts 3,5-dimethyl phenol are added and the heating is continued for ½ hour. The water tolerance is then 3. Thereupon 48 parts of sodium phenoxide tetrahydrate of Example XIII dissolved in 8 parts of water are added and the mixture is dehydrated in vacuo for 3½ hours to 33° C. and 27 mm. Hg. The viscosity at 72.1% solids is 40,000 cps. at 25° C. The gel time of the final resin syrup is 320 at a water tolerance of 119.

The addition of 6% NaOC₆H₅ more to the final resin decreases the gel time to 303 and increases the water tolerance to 265.

*Example XI*

This example illustrates the formation of a cresol-formaldehyde resin having a phenol to aldehyde ratio of 1:2.4 which is substantially undilutable with water and is then modified by the addition of sodium phenoxide which enables the resin to be diluted by water to give controlled viscosity permitting the resin syrup to be employed for coated abrasive use.

To a solution of 432 parts of a meta-para cresol mixture in 768 parts of 37% formalin, 8.7 parts of 50% aqueous sodium hydroxide are added producing a mixture with a pH of 8.72. The mixture is reacted while stirring and under reflux by heating to 83° C. in one hour and holding for 1½ hours to a cloud point of 51° C. Forty-eight parts of the sodium phenoxide product of Example XIII dissolved in 21 parts of water are then added to the mass and it is vacuum dehydrated for 3¼ hours to 29° C. at 23.7 mm. Hg. The viscosity of the resulting resin syrup at 65.1% solids is 8,250 cps. at 25° C. with a gel time of 348 and a water tolerance of 50. By adding 7% NaOC₆H₅ more the gel time is reduced to 313 and the water tolerance increased to 126.

*Example XII*

This example illustrates the modification by sodium phenoxide of a furfural-phenol-formaldehyde resin having a molar ratio of components of 1:1:1.5.

Furfural 392 parts and phenol 376 parts are heated together in the presence of 7.5 parts of sodium carbonate to a temperature of 130° C. until 19 parts of condensate (principally water) are obtained. The product is then reacted with 180 parts of paraform at 71–87° C. for 4½ hours. The viscosity of the product at 81.2% solids is found to be 18,000 cps. at 25° C. with a gel time of 1155 at a water tolerance of 54. On adding 5.5% NaOC₆H₅ the gel time is decreased to 674.

*Example XIII*

This example illustrates the preparation of a crystalline sodium phenoxide product which is used as the modifying agent in most of the examples of this specification.

To 570 parts 82.5% aqueous phenol, 400 parts of 50% aqueous sodium hydroxide are added dropwise while agitating and cooling moderately. The mass is then chilled at 40° F. until a solid crystalline mass is formed which has a melting point of 30–34° C. This material contains approximately 40% water by weight and 60% of sodium phenoxide, corresponding closely to a tetrahydrate of sodium phenoxide. The potassium, and lithium phenoxides are prepared similarly only substituting equivalent molar proportions of potassium or lithium hydroxide for the sodium hydroxide.

Other phenoxides are found to require special methods of preparation, frequently substituting alcohol or 50/50 alcohol/water for the water. Where possible water or other solvents are omitted.

*Example XIV*

This example illustrates the modification of a Novolak resin with sodium phenoxide and for the sake of comparison also with sodium hydroxide in a molecularly equivalent amount.

(a) Ten parts of a solid powdered phenol-formaldehyde Novolak resin, "Bakelite #2417," only very slightly soluble in water are dissolved in a solution of 2 parts of NaOC₆H₅·4H₂O and 4 parts of water to form a thick smooth paste. The paste can be thinned to a viscous solution by adding 1.7 parts more water, the limit of water miscibility at 30° C. The solution formation is endothermic.

(b) By adding 4 parts of NaOC₆H₅·4H₂O dissolved in 5 parts water to 10 parts of "Bakelite #2417," a thin smooth paste is obtained which may be diluted to 33.5% solids at 30° C. to form a thin liquid. The solution is again endothermic.

(c) To 10 parts of "Bakelite #2417," 1.63 parts of 50% aqueous sodium hydroxide diluted with 4 parts water are added. A strong exothermic reaction results forming a very heavy paste of rubber-like consistency which requires 4 parts more of water to reach a viscosity equivalent to that obtained with the sodium phenoxide and 5 parts of water in (b). In contrast, this sodium hydroxide solubilized resin is miscible with water in all proportions whereas the sodium phenoxide treated products (a) and (b) have limited solubility.

It is evident that sodium hydroxide and sodium phenoxides have a marked difference in their action on preformed fusible phenolic resins.

*Example XV*

This example illustrates the formation of a resin having the same phenol to formaldehyde ratio as in Example I but in which the extent of condensation prior to vacuum dehydration and modification with sodium phenoxide is not carried to the same extent as in Example I resulting in the formation of a resin with a greater degree of water miscibility.

To 768 parts of formalin (37.5%) and 376 parts of phenol, 7.95 parts of 50% sodium hydroxide solution are added while stirring in a reactor to produce a mixture with a pH of 8.5. Heating is conducted under reflux raising the temperature to boiling (99° C.) in one hour. The mass is then cooled to 80–84° C. and held here for 3 hours to form a resin syrup having a water tolerance of 115. This product is next dehydrated partially in vacuo (45° at 62 mm. Hg) to 69% solids and a viscosity of 500 cps. (25° C.). The water tolerance at this point is 102 and the gel time is 732.

The addition of 6.5% $NaOC_6H_5$ to the resin gives a gel time of 499 and a water tolerance of 391.

It will be noted that when the resin is advanced in the kettle to only a water tolerance of 115, the gel time is greater than when taken down to 0 water tolerance or lower. However, the gel time is reduced on adding sodium phenoxide and the water tolerance is increased as is the case in modification of resins condensed to a lower water miscibility.

*Example XVI*

This example illustrates the contacting of a phenolic resin with the basic phenolate by coating particles of solid material, namely, abrasive grain, to be bonded to a backing sheet by means of a phenolic resin adhesive with the basic phenolate.

750 parts of 24 grit aluminum oxide abrasive grain are wet mixed with a solution of 3.75 parts of monosodium resorcinoxide dissolved in 16 parts of methanol to uniformly coat the grain with the solution. Then, 29 parts of powdered $Fe_2O_3$ are mixed in with the wetted grain to form a non-cohesive coating over the wetted grain surface. The iron oxide, in effect, dries out the wet coating and produces free-flowing grain.

The grain is screened uniformly onto an adhesive maker coat of 10 to 12 mil thickness of the resin adhesive composition of Example I containing 50% by volume of subdivided $CaCO_3$ coated on 12.5 warp drills cotton fabric backing. The grain is then firmly set in the adhesive film by subjecting the grain coated sheet to a temperature of 190° F. for 8 to 10 minutes in a hot air oven.

The partially cured sheet is next size coated with the adhesive composition used for the maker coat, but diluted with $H_2O$ to a viscosity of 2700 cps. at 100° F. Enough of the adhesive is applied to give a final size coat which covers about ⅔ the height of the grain. The size coated sheet is cured using a graduated cycle of 3½ hours starting at 125° F. and ending with a maximum of 225° F.

The resulting cured coated abrasive sheet is cut and formed into 9 inch discs and tested by standard disc testing methods and compared to standard control samples for abrasive cutting and endurance characteristics. The discs are found to remove an average of 130 grams of steel from standard steel test bars in the same period of time as an average of 78 grams is removed by the standard control discs, i. e., a cut of 167% of standard.

In another case, coated abrasive sheets are made by the above procedure except that the grain received no surface treatment with a basic phenolate. The product required a minimum of 15 minutes at 190° F. to set the grain to the same degree of firmness before size coating as in the first case.

MODIFICATIONS AND EQUIVALENTS

As illustrated in the foregoing examples, a wide variety of phenolic resins may be modified with basic phenolates of phenolic resins in accordance with the present invention. The observable extent of modification of the phenolic resins upon addition of basic phenolates varies depending upon the specific composition of the phenolic resin and the molar ratio of aldehyde to phenol component in the resins.

As far as the phenol component of the resins is concerned, most pronounced results are obtained in accordance with the present invention with resins made exclusively of monohydric phenols and especially the monocyclic monohydric phenols. Examples of useable phenolic components for the resins of this invention are as follows:

Phenol
2-methyl phenol
3-methyl phenol
4-methyl phenol
3,5-dimethyl phenol
3,4-dimethyl phenol
2,3-dimethyl phenol
3-ethyl phenol
3-butyl phenol
2-chlorophenol
4-chlorophenol
2-methyl-3-chlorophenol
2,3-dimethyl-4-chlorophenol
2-bromophenol
4-acetophenol
2-nitrophenol
4-nitrophenol
2-chloro-4-nitrophenol
Salicylic acid
4-hydroxy-4'-carboxy diphenyl
3-methoxyphenol These are representative and their chemical equivalents may also be used. Mixtures of one or more may be used, sometimes to advantage, when such mixtures occur as readily obtainable commercial products. Some of these materials are better employed in minor proportions with others, e. g., phenol and 3-methyl phenol, rather than as the sole phenolic component.

The aldehyde components of the resins may be of different types. Although the phenolate modification of this invention is most pronounced with resins made of formaldehyde, other aldehydes which may be used in forming the resins are as follows:

Paraldehyde
Paraformaldehyde
Acetaldehyde
Propionaldehyde
Butyraldehyde
Acrolein
Benzaldehyde
Furfural
Crotonaldehyde Formaldehyde may be used as a gas or as a solution in various solvents, e. g., formalin. Mixtures of the aldehydes may be used. Also compounds which give rise to aldehydes under the reaction conditions, i. e., aldehyde donors, may be employed in place of or in addition to the aldehydes themselves, e. g., hexamethylene tetraamine.

The basic phenolate modification technique of this invention may be applied to preformed resins of widely varying phenol to aldehyde ratios. Thus, the principle of the invention may be used even on Novolak type resins where insufficient aldehyde is combined with the phenol to give a heat-convertible product. However, when used with such resins, additional aldehyde sufficient to cause thermosetting should be added to the two stage resin to be modified by the basic phenolate prior to the step of thermosetting of the resin in the presence of the phenolate. This may be done by addition to the two stage resin of products such as paraformaldehyde, hexamethylene, tetraamine, methylal, trimethylol nitromethane, trimethylol aminomethane, or other aldehyde donors.

In the case of phenol-aldehyde resins of the heat-convertible type, i. e., those which do not require the addition of further aldehydes or aldehyde donors to complete thermosetting to an infusible state, the phenol to aldehyde molar ratio in the resins is preferably relatively high, i. e., between about 1:1.4 and 1:3. The most striking modification with the basic phenolates is observed in the molar ratio range of between 1:1.5 and 1:2.8.

A wide variety of condensation catalysts may be employed in the formation of the phenolic resins. Thus, either acidic or alkaline materials may be used in varying quantities to catalyze the condensation between the phenol and aldehyde components of the resin. However, all the materials are not equally effective for this purpose and best results according to the invention are obtained by the use of "alkaline condensation catalysts." This term comprehends any of the alkaline reacting materials known to be useful as catalysts in the formation of phenolic resins and includes the oxides or hydroxides of sodium, potassium, lithium, calcium, barium, strontium, magnesium, zinc, aluminum, and ammonia; the borates and carbonates of sodium, potassium, lithium and strontium; amines such as ethylene diamine, aniline, cyclohexylamine or the like, quaternary ammonium bases, e. g., tetramethyl ammonium hydroxide, methyl pyridium chloride or the like and mixtures of such compounds.

The exact quantity of condensation catalysts employed in forming the phenolic resin will depend to some extent upon the specific catalyst used as well as upon the individual phenols, or aldehydes used in making the resin. However, with most resins, superior results have been obtained using concentrations of the condensation catalysts of about 1 to 4% by weight based upon the weight of the phenol component of the resin. The catalysts may be added as water or organic solvent solutions or as slurries with water or with the phenol or aldehyde components of the resins. In the case of NaOH or other alkali metal hydroxide, addition is best made as a water solution of 25 to 50% by weight.

The basic phenoxides referred to herein may be used as condensation catalysts by adding them to the reaction mixture during the initial phenol-aldehyde condensation. However, the phenoxides do not remain as such for long as they readily combine with the phenol alcohols formed in the reaction, i. e., the initially added portion of basic phenolate cannot serve both as a condensation catalyst and as a cure accelerator. Hence, if they are added at the initiation of the resin formation they must be replenished by the addition of further quantities after the preforming reaction has been substantially completed and, preferably, just before the resins are to be thermoset in the case of one stage resins or added in the blender or in the last mixing roll in the case of two stage resins.

The temperature used in the condensation reaction is not critical and may be varied in consideration of the exact properties desired in the final phenolic resin as well as the nature of the condensation catalyst and components used in the resin formation. A broad temperature range of about 50 to 150° C. is satisfactory whereas the most outstanding results are obtained with resins condensed at a temperature of between 70 and 100° C. Reaction temperatures above the boiling point of the reaction mixture, if desired, may be obtained by the use of pressure equipment.

The degree of condensation of the phenolic resins prior to modification with basic phenolates in accordance with the invention may be varied. It is dependent in part upon the type and quantity of the condensation catalyst used as well as the phenol and aldehyde components. Primarily, however, the temperature of condensation and length of time the reaction mixture is held at the elevated temperature controls the degree of condensation.

In general, the phenolate modification principle of this invention may be applied to any phenol-aldehyde resin which has been stopped in the condensation reaction short of complete conversion to the infusible state. Thus, provided that the resin is still heat-convertible, i. e., capable of being transformed by heating to elevated temperatures to an infusible state or capable of being rendered so by addition of aldehyde donors, the accelerating effects of the basic phenolates on the monohydric phenol-aldehyde resins may be experienced.

The present invention is most effective with monohydric phenolic resins which have been condensed in an aqueous medium only to an extent where they are still miscible at least to a slight degree with water. When the condensation is conducted in an aqueous medium, the extent of condensation can be followed and determined by testing the water tolerance or cloud point of the reaction mass according to the procedures described in the following section of this specification. The most satisfactory degree of condensation is evidenced by a zero water tolerance, i. e., the point where incipient formation of two phases occurs when a portion of the reaction mixture is removed from the reaction kettle and cooled to 30° C. However, satisfactory aqueous resin syrups to be modified in accordance with the invention can be obtained even when the condensation is carried beyond this point, but reaction in an aqueous medium should not be allowed to progress to the point at which the reaction mass gels at the elevated temperature used in condensation. The actual amount of time required to obtain these degrees of condensation will depend upon the reaction temperature used and will generally be longer the lower the temperature. In the preferred reaction temperature range of 70–100° C., times of 2 to 8 hours are representative.

The preceding examples show that the basic phenolates may be added to the phenolic resins at various stages. However, as indicated, the basic phenolate addition will not be satisfactory for the modification of the resin if added too early in the resin formation. Hence, the phenolic resins should be condensed to the point where they have a water tolerance of 200 or less, and preferably between 150 and 0, before the basic phenolate is added.

Phenol-aldehyde resins of the type formed as described above have generally been referred to in the prior art as "A" or "B" stage phenolic resins. These are modified according to the present invention with basic phenolates which have been discovered to act as accelerating agents for the final cure to the tough, strong, thermoset state which characterizes such resins. Furthermore, by selection of the basic phenolate, it is possible not only to control the rate of cure and rate of gelling of such resins, but also to regulate the water dilutability, viscosity, pot life, storage stability and tackiness of the phenolic resins.

For many uses to which the phenolic resins are put, the regulation of water dilutability by means of the basic phenolates is of as great an importance as the acceleration of the cure rate. As an example of this, the water tolerance of the preferred phenolic resins before the addition of the basic phenolates will lay between 0 and 150 and preferably between 0 and 50. Depending upon the amount of basic phenolate added, this can be increased five to tenfold, e. g., broadly to a water tolerance of between 1 and 1500 and in most instances to between 2 and 400. The water dilutability or water tolerance of the new resins may be varied within these limits by increasing the quantity of the simple phenolates of the alkali metals or of other less hydrophilic complex phenolates or phenolates of the alkaline earth hydroxides, or by mixtures of the complex and simple phenolates.

The pH of the phenolic resins is also affected to some extent by modification with the basic phenolate. The preferred phenolic resins broadly have a pH range of 4 to 9.5 and, preferably, between 6 and 8 before addition of the phenolate. After the addition of a desirable quantity of basic phenolate, the pH will vary broadly from 6 to 10 and with the better resin compositions between 7 and 9.5. Hence, the new resins have low alkalinity as distinguished from other phenolic resins whose reactivity is obtained by relatively large additions of caustic as described in the prior art. The total inorganic alkali content is preferably below 4%, but may range up to 10%. However, the higher the alkali content of the resin the more brittle and weaker is the finally cured film and the greater the water sensitivity of the cured film which must be kept low when "waterproof" type abrasive products are desired.

The concentration of any resin solution to which the modifying basic phenolate is added is not critical. Actually, as has been shown before, the basic phenolate may be added to solid phenolic resins with satisfactory results. However, since most outstanding results and advantages in accordance with the present invention have been observed in connection with aqueous phenol resin solutions or "syrups" useful as adhesive compositions, the principle of the invention is most effectively applied to aqueous phenolic resin solutions of a solids content of 50% or higher, and especially a solids content of 60 to 90% by weight.

The phenolate curing modifiers are, of course, a critical portion of the present invention. Those materials which may be used in this manner have been broadly referred to herein as "basic phenolates." By this term is meant the metal salts of phenols which are alkaline in reaction and which are made from a metal cation of sufficient basicity to form a salt with the particular phenol in question. The important phenolates are those of sodium, potassium, lithium, calcium, barium and strontium.

The phenolates may be formed from a large variety of different types of phenols both monohydric and polyhydric as well as monocyclic and polycyclic. Representative of the types of phenols which may be used are those included in the following list:

Monocyclic monohydric phenols:
    Phenol
    O, m or p cresols
    Xylenols
    Chlorophenols
    Nitrophenols
    Chloronitrophenols
    Bromophenols
    Alkyl phenols, e. g., o, m or p ethyl, propyl or butyl phenol
    Alkoxyphenols, e. g., methoxyphenol
    Acyloxyphenols, e. g., methyl salicylate
    Alkyl carbonyl phenols, e. g., 2-hydroxy acetophenone
    Alkyl chloro phenols, e. g., 2-methyl-5-chlorophenol
    Carboxy phenols, e. g., salicylic acid.

Monocyclic polyhydric phenols:
    Resorcinol
    Phloroglucinol
    Catechol
    Pyrogallol
    Hydroquinone
    Orcinol
    Monochlorohydroquinone Polycyclic phenols:
    Phenyl phenols
    Alkyl phenyl phenols, e. g., methyl phenyl phenol
    Naphthanols
    Alkyl naphthanols
    Polyhydroxy diphenyls, e. g., 4,4'-dihydroxy diphenyl
    Bisphenol The phenolates of these phenols and equivalent phenols may be used individually or as mixtures of two or more. Naturally occurring or commercially occurring mixtures may be used to advantage in some cases.

The basic phenolates vary in their modifying abilities depending on the structure of the phenol and to a less extent on the modifying cation combined therewith. There is only a slight difference in the reactivity of sodium, potassium or lithium phenoxides, but there is a more marked difference in the catalytic action between sodium phenoxide, sodium meta-cresoxide and sodium resorcinoxide to name a few. The speed of cure and rate of gelling of resins modified with the latter is the greatest, followed by meta-cresoxide and finally sodium phenoxide. There is another difference here, in that the water tolerance or water dilutability of the resin modified with equal quantities of these adjuvants is greatest with sodium phenoxide followed then by the meta-cresoxide and finally the resorcinoxides. It is possible, therefore, to modify the physical properties of the phenolic resins by using a blend of these agents to obtain any desired combination within limits. Another unique feature of these accelerators is the possible regulation of the pot life, gel time and cure rate, not only by the proper selection of the subject phenolates, but by the addition of phenol or substituted phenols usually not in excess of four mols per mol of phenolate accelerator.

The basic phenolates are prepared by reacting equimolecular quantities of metal hydroxide or oxide with the phenol in an aqueous or alcoholic media, producing usually a hydrate or alcoholate. In the case of polyhydric phenols, one or more equivalents of the alkali up to the total hydroxyl component may be utilized. These phenolates are soluble in the "A" or "B" stage resins with little or no heat evolved, whereas addition of alkali metal hydroxides generate considerable heat which may suddenly gel or rapidly thicken the resin.

It has been determined that there is an optimum quantity of the phenolate to be added to any given resin beyond which there is no further acceleration in the cure, although the water tolerance of the herein described resins may be further modified if needed. With some phenoxides, vis. sodium phenoxide, a retardation in cure may even result if the maximum quantity for the fastest cure is exceeded. With others, vis. sodium resorcinoxide, the cure may be made too short for many purposes. Other phenolates range in between these two, with those from dihydric mononuclear phenols being the most effective in accelerating the cure, but likewise giving shortest pot life, the highest rate of viscosity increase, the fastest gelling and low water tolerance. For most resins and conditions, however, it has been found that a quantity of basic phenolate corresponding to between 1 and 15% by weight of phenolate, or the equivalent when a hydrate salt or solution is employed, and especially 2–8%, based upon the weight of the resin, or resin content were applied to a solution, gives unique results. Where more active phenolates, e. g., resorcinoxides, are used, generally smaller amounts are used and as little as 0.1% of such active materials can be effective.

The addition of the phenolates influences the viscosity of the modified resin, the extent depending on the specific phenolate added. Sodium phenoxide will generally produce a reduction in viscosity on the amount added, the viscosity of the modified resin and the extent of advancement toward the "C" stage. Very reactive phenolates like the sodium or potassium resorcinoxides will cause an increase in the viscosity of the modified phenolic resin. It is possible therefore to adjust viscosity by selection of the phenolate. Likewise, the storage stability and "pot life" may also be increased or reduced upon the choice of the appropriate phenolate, sodium, potassium, and lithium phenoxide favoring a long pot life and good storage stability and at the other extreme sodium resorcinoxide or the phenolate of other dihydric mononuclear phenols produces a shorter pot life and smaller storage stability. Other phenoxides generally fall between these two extremes.

The viscosity of the final phenolate modified resin or resin solution will be governed primarily by the use to which the resin product is to be put. In the case of aqueous solutions to be employed as adhesive compositions, the preferred viscosity range is between about 5,000 to 100,000 cps. at 25° C. regardless of the solids content of the solution.

The conditions employed in heat converting the resins modified with the basic phenolates are not critical and may be varied to compensate for the type of structure or product being fabricated from the modified resins. Thus, substantially any thermosetting conditions known to the prior art can be employed but, of course, the phenolate modification permits the temperature and/or time of curing generally to be reduced by about 25 to 200%. The broad curing temperature range would generally be 60 to 300° C., although with the more reactive phenolates, e. g., disodium resorcinoxide, the mass may be gelled at lower temperatures, e. g., 30° C. in 20 minutes. The preferable range, particularly for use in connection with cellulosic materials, such as in the formation of coated abrasives with cellulosic backing sheets or the formation of plywood, about 160° F. to 250° F. The time of cure, of course, will vary with the temperature employed and times of 4 to 6 days at the lower limit of the range to 10 to 30 minutes at the upper limit of the range are illustrative.

The resin may be spray dried advantageously where a water free product is wanted. In this case, the phenolates may be added immediately before spray drying or if preferred may be added as a powder with the sprayed material. The phenolates in this latter instance should, of course, be dehydrated to at least a trihydrate or lower if the material is to be used as a molding powder since excess moisture tends to produce porous molded products.

Resin compositions prepared according to this invention may be modified by inclusion of various additives such as fillers, pigments, dyes, other resin or plastic materials, solvents, plasticizers, pore-forming agents, stabilizers, and mold or other lubricating agents. The exact additive employed, of course, will depend upon the use for which the composition is designed. Where the phenolate-modified phenolic resin product is to be used in coated abrasive manufacture, advantage can be had from the addition of about 25 to 55 percent of specially sized non-fibrous fillers as disclosed in U. S. Patent 2,322,156, e. g., calcium carbonate, garnet, marble, aluminum oxide and special clays. For other uses, typical fillers would be wood flour, cotton or other natural or synthetic flock, quartz, asbestos, grain hulls, nut hulls, pulp, etc. Examples of plastic or resin additives include rosin or other natural resins and gums, natural and synthetic rubbers, condensation type polymers, such as alkyd resins, polyamides, aminoplasts, including urea-aldehyde and melamine-aldehyde type resins, and addition polymers, e. g., vinyl resins, acrylic resins, and allyl ester resins.

The equipment or apparatus used in any stage of this invention is not an important factor and substantially any type of vessels, agitators, pressure equipment or the like known to be useful in this type of reaction may be employed. As a matter of fact, because of the low metal corrosive properties of the phenolate modified resins, a wider latitude especially in metal casting molds or other equipment is possible with these new resin compositions.

DEFINITION OF TERMS AND TESTS

For the sake of clarity and understanding, the various special terms and tests referred to herein are defined and described below.

The "pencil hardness test" is used as a method of determining the rate of cure of the phenolic resins. The resin compositions under test are cured at (in all cases) 190° F. and the hardness of the resin film at any chosen time is measured by taking drawing pencils of a wide hardness range and finding the pencil which just barely makes a groove in the surface of the resin at 190° F. The pencils employed are the "Turquoise" drawing pencils manufactured and sold by the Eagle Pencil Company of New York in sixteen degrees of hardness ranging from 5B, the softest, to 9H, the hardest. The full range is as follows: 5B, 4B, 3B, 2B, B, HB, F, H, 2H, 3H, 4H, 5H, 6H, 7H, 8H and 9H. The hardness values of the cured resins are quoted in terms of the pencil just barely making a groove at 190° F., e. g., a pencil test hardness of HB.

The "snip test" is another method employed to determine the apparent rate of cure or degree of cure of thin films of resins made from the phenolic resin compositions. The test measures the friability of the resin film after different curing periods. The test is carried out by coating films about 14 mil in thickness on 20 mil vulcanized fiber and curing the films for a specified time at 190° F. The various coated fiber sections are then cut transversely with a dull pair of shears or heavy tin snips. An uncured resin film is plastic and gives a clean cut, but as the cure advances the film becomes very brittle and friable to an extent of separating from the fiber at the point where the pressure of the blade is applied. Satisfactory resins then gradually become tougher upon further curing and finally arrive at a point where a clean cut is made without cracks around the edges. Visual observation is made of the cut sample and is rated by the observer on the following scale:

| Observation: | Designation |
|---|---|
| Plastic | plastic |
| Friable | F |
| Very slightly friable | v.sl.F. |
| Slightly friable | sl.F. |
| Very friable | V.F. |
| Tough | T |

The "boil test" measures the water sensitivity of cured resin films and as such affords another means of measuring the rate of cure of the resins. The test is conducted by coating 20 mil vulcanized fiber with about a 14 mil coating of the resin composition and then curing the coated sample at 190° F. for a specified time. After the samples have cured for the required time, they are removed from the curing oven and immersed in boiling water for 15 minutes. The results of the test are visually observed and rated by the operator according to the following scale:

1.=soluble
2.=partial dissolution
3.=slight dissolution
4.=whitening without solution
5.=insoluble The resistance of cured films to boiling water for 15 minutes progressively increases with the cure from water solubility to water insolubility and finally to boiling water insensitivity, i. e., where no change in color or whitening of the film is observed.

The "gel time" is an accelerated method of estimating the approximate relative curing rate of any resin composition which is normally liquid at about 100° C. or below. The test is conducted by measuring 1 gram of resin or resin solution having a temperature between 20 and 30° C. into a 3" x ⅜" soft-glass test tube, then immersing the test tube into a thermostatically controlled oil bath having a temperature of 121.2° C.±0.2 and continually moving a straight piece of #17 B & S gauge coppered iron wire up and down through the solution in the test tube. The results of the test are expressed in the number of seconds of time elapsing between the immersion of the test tube in the oil bath and the point at which the wire cannot be removed from the body of resin in the tube without lifting the test tube out of the bath.

The "water tolerance test" affords a measure of the miscibility of the phenolic resin with water and in turn the degree of condensation of the phenol and aldehyde components of the resin. The test is conducted by taking a 10 gram sample of the resin or resin solution, adjusting its temperature to 30° C. and then titrating the mass with distilled water until the first appearance of cloudiness in the mixture indicates the incipient formation of two separate phases and the immiscibility of further water at the 30° C. temperature with the mixture. The water tolerance values are expressed in terms of the cubic centimeters of distilled water multiplied by 10 per 10 grams of resin which the resin sample will tolerate without formation of two separate phases at 30° C. (cc.×10/10 g. at 30° C.).

The term "pot life," sometimes also called "working life," refers to the period of time that the resin, and particularly resin adhesive formulations, may be maintained at the elevated temperatures, e. g., 90 to 200° F., to which they are generally heated and maintained during use, without the resulting composition gelling or hardening to such an extent that it cannot be brushed, sprayed or otherwise applied. A desirable pot life is 6 to 8 hours or more at 100° F.

The terms "storage life" or "storage stability" mean the period of time that the resin products can stand at temperatures up to 40° F. without gelling or undergoing other physical or chemical change to such an extent that they cannot be used for the purposes for which they are designed, e. g., so that they cannot be brushed, sprayed or otherwise coated as thin films.

The term "cloud point" means the temperature in °C. at which turbidity first occurs on the cooling of a sample of the resin when it is taken from the reaction kettle in the condensation of the phenol and aldehydes in forming the resin. The "cloud point" is a measure of the degree of condensation and water miscibility of the resin. A "cloud point" of 30 corresponds to a water tolerance of zero.

CONCLUSIONS

The improvements in the art of formation of phenolic resins described herein provide new techniques for the manufacture of phenolic resins and new types of phenolic resin products.

In general, the principles of this invention may be applied to all types of phenolic resin compositions such as molding resins used in casting or compression molding or the like either unfilled or combined with inert fillers or modifiers but the invention is particularly applicable to resin adhesive compositions.

In the case of molding resins, the basic phenolate accelerators are advantageous since they have no corrosive action on the molds. Hence, finish on the mold pieces will be brighter than the unmodified molding powder giving the molded pieces greater eye appeal. Furthermore, it has been found that the phenolate modified resins retain water in the resin phase to a much greater degree than do the unmodified resins thus producing clear, transparent castings without the need for use of the customary lactic acid and glycerine or requiring much smaller amounts of lactic acid and glycerine in the formation of transparent castings.

The increase in curing rate due to the modification of the resins by the basic phenolates aids greatly in the use of phenolic resin for adhesive purposes particularly where waterproof bonds are required such as in lawn furniture, glass fiber structures, exterior plywood, boats, fishing equipment, wooden aircraft and automobile bodies, trunks, railroad car bodies, pontoons, cloth or paper based laminates, sporting equipment, shipping containers, sand core bonding, roadway and landing strips, plywood formation and fabrication, sealing oil well stratae, and in the making of coated abrasives and bonded abrasive wheels. Further, the toughness of the cured resin films modified with sodium phenoxide is improved over that of unmodified resin films so that a firmer bond is obtained between abrasive grains and a supporting member, e. g., paper, cloth, fiber, rubber, metal, plastic or like webs. The addition of the basic phenolates also increases the surface gloss of cured mixtures containing fillers, pigments, or other particulate material, giving improved appearance to the product.

I claim:

1. A process for producing a rapid-curing phenolic resin adhesive composition which comprises: heating in an aqueous medium 1 mol of a monohydric phenol with between 1.5 and 2.8 mols of an aldehyde in the presence of between about 1 and 4% by weight of said phenol of an alkaline condensation catalyst until a fusible, heat-convertible condensation resin having a water tolerance not greater than 200 is formed; discontinuing the heating before the resin mass gels; distilling off volatile materials from the resulting resin solution under vacuum to give an aqueous solution of said resin of between about 60 and 90% solids by weight; and thereafter admixing with said resin solution a quantity of between 2 and 8% by weight of such resin of a phenolate selected from the group consisting of sodium, potassium, lithium, calcium, barium and strontium monocyclic and bicyclic phenolates.

2. The fusible, rapid-curing liquid phenolic resin adhesive composition of the process of claim 1.

3. A process for producing phenolic resin adhesive solutions of high solids content which may be stored over relatively long periods of time although being capable of rapidly heat-curing to an infusible state which comprises: condensing in an aqueous medium between 1.5 and 2.8 mols of formaldehyde with 1 mol of a monohydric phenol in the presence of 1 to 4% by weight of the phenol of a basic hydroxide by heating at a temperature of between 70 and 100° C. until the mass has a pH between 4 and 9.5 to form a heat-convertible, fusible, phenolic condensation product having a water tolerance between 0 and 150; discontinuing the heating before the reaction mass gels; vacuum distilling the resulting mixture to give an aqueous phenolic solution having a solids content of between about 60 and 90% by weight; and then mixing with said resin in solution between .1 and 8% by weight of such resin of at least one alkali metal monocyclic phenolate.

4. A process as claimed in claim 3 wherein said basic hydroxide is sodium hydroxide.

5. The fusible rapid curing liquid phenolic resin adhesive composition of the method of claim 4.

6. The process of forming a strong, tough, infusible film of a phenolic resin having a high surface gloss which comprises: reacting in an aqueous medium between 1.5 and 2.8 mols of an aldehyde with 1 mol of a monocyclic monohydric phenol in the presence of between 1 and 4% by weight of the phenol of a basic hydroxide at a temperature between about 70 and 100° C. for sufficient time to give a mass with a pH of between 4 and 9.5 containing a fusible, heat-convertible, water-soluble phenolic resin having a water tolerance between 0 and 150; discontinuing the heating before the reaction mass gels; vacuum distilling the resulting mixture to give a phenolic resin solution having a solids content of between 60 and 90% by weight; then admixing 2 to 8% by weight, based upon the weight of the resin in said solution, of an alkali metal monocyclic phenolate with said solution; forming a film of the resulting viscous solution by coating the solution upon a suitable backing; and then thermosetting the resin content in the film to an infusible state.

References Cited in the file of this patent

UNITED STATES PATENTS

| | | |
|---|---|---|
| Re. 23,347 | Redfern | Mar. 20, 1951 |
| 1,126,926 | Wiechmann | Feb. 2, 1915 |
| 1,811,808 | Redman | June 23, 1931 |
| 2,272,155 | Muller | Feb. 3, 1942 |
| 2,401,138 | Coes | May 28, 1946 |
| 2,557,826 | Keaton | June 19, 1951 |

FOREIGN PATENTS

| | | |
|---|---|---|
| 2,122 | Great Britain | Jan. 28, 1909 |
| 305,237 | Great Britain | May 2, 1930 |
| 357,259 | Great Britain | Sept. 24, 1931 |